3,464,121
PARALLEL-FLOW PNEUMATIC-CONVEYING DRYING
Joji Fukada, Seiji Akatsu, Mitsuaki Sugahara, Yoshiji Kurita, and Naoshi Kawabe, Iwaki-shi, Japan, assignors to Kureha Kagaku Kogyo Kabushiki Kaisha, Tokyo-to, Japan
Filed Dec. 13, 1966, Ser. No. 601,443
Claims priority, application Japan, Dec. 29, 1965, 40/80,920
Int. Cl. F26b *3/08, 3/10*
U.S. Cl. 34—10  5 Claims

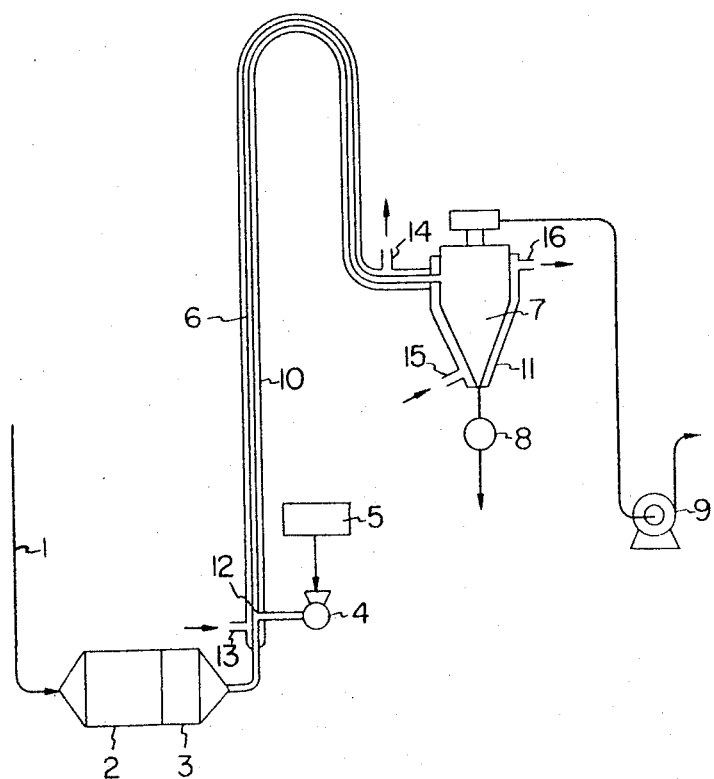

ABSTRACT OF THE DISCLOSURE

In drying substances which are readily decomposed or melted by heat in a parallel-flow pneumatic-conveying drying apparatus, there is an introduction of forced cooling of the drying tube and the product collector from their external surfaces so as to avoid adherence of the melted substance onto the internal wall of the tube causing lowering of the product quality and efficiency of the apparatus.

---

This invention relates to improvements in or relating to the parallel-flow pneumatic-conveying drying technique for drying substances which are readily decomposed or melted by heat as, for example, thermoplastic resins and organic substances. The invention particularly contemplates the provision of improvements directed toward the prevention of adverse occurrences such as the decomposition or melting of these substances by the high temperature during drying, whereby they adhere to parts of the drying apparatus, and lowering of the product quality.

While pneumatic conveying dryers are commonly used for drying thermoplastic resins, food products, agricultural chemicals, and many other solids, various difficulties are incurred in cases where the drying temperature exceeds the decomposition temperature of the solid or exceeds the fusion adherence temperature of the solid (which becomes adhesive upon assuming a semi-molten state). For example, in the case of a thermoplastic resin, it tends to adhere to the apparatus walls to cause clogging of the dryer, and, moreover, since the adhering product is exposed for a long time to an air current at a high temperature, it becomes discoloured and, even if it is recovered from the apparatus wall, it cannot be used as a product and will constitute a loss. Furthermore, this adhering substance peels off in many cases during the operation and enters the principal mass of product, whereby the quality of the entire product is lowered.

For the purposes of preventing the adherence of these materials, there is a known method whereby vibration or impact is imparted to a part of the apparatus. This method, however, requires a separate device for this purpose and, furthermore, increases the rate of depreciation of the drying apparatus because of the necessary vibration or impact stress. Furthermore, this method does not afford a fundamental solution to the problem of adherence since the substance which has once adhered to the apparatus parts is knocked off by the vibration or impact, and, consequently, admixing of decomposed substances and other impurities with the product cannot be avoided.

Expedients such as reducing the rate of feed of the product to be dried or lowering the drying air current temperature in an attempt to reduce the adherence, of course, lower the operational capacity of the apparatus. Moreover, there have been frequent cases in the past wherein a lowering of the drying temperature has given rise to even an increase in the quantity of adherence.

It is an object of the present invention to prevent the above described adherence of substances to the apparatus parts and lowering of the product quality without incurring the aforedescribed difficulties.

More specifically, an object of the invention is to provide relatively inexpensive improvements in the pneumatic conveying drying technique particularly for preventing adherence and lowering of product quality and for improving the drying efficiency.

That is, the invention contemplates the provision of improvements in method and apparatus for parallel-flow pneumatic-conveying drying of easily adhering solid materials.

As a result of considerable study of the above described problem of adherence, we have found that the adherence of the material to be dried to the inner wall surfaces of the apparatus can be almost completely prevented by forced cooling from the outside of the drying tube, product collector, and other principal parts of a parallel-flow pneumatic conveying drying apparatus.

Such a technique of cooling the principal drying parts of a drying apparatus from the outside may, at first, appear to be a haphazard method which completely neglects the thermal efficiency of a drying apparatus and to lead to a lowering of the drying efficiency. We have found, however, that the disadvantage resulting from the heat loss is of an extremely small magnitude which is negligible in comparison with the advantages of the remarkable improvements in product quality, yield, and drying efficiency which result from this method. Furthermore, we have found that the drying efficiency, rather than being decreased, is actually increased substantially because operational problems existing heretofore, such as operation shutdowns for cleaning of the apparatus and the limitation imposed by adherence to increases in the feed rate of the material to be dried, are solved by this cooling technique.

For example, in many cases where a solid to be dried containing water as a volatile component is to be dried by parallel-flow pneumatic-conveying drying, a hot air current at a temperature of 100 degrees C. or higher is used. In such a case, when the solid to be dried and the hot air are mixed in a drying tube, the water contained in the solid evaporates abruptly and absorbs heat from the surrounding substances, whereby the temperature within the tube progressively decreases.

Furthermore, the temperature of the solid progressively rises because of the temperature of the hot air and becomes substantially equal to the temperature at the outlet of the hot air at the time of completion of the drying. However, when the water content is high, since the heat is absorbed principally as heat of evaporation, the temperature is maintained at a value lower than the temperature of the surroundings.

On one hand, since the inner walls of the passages of the apparatus for the passage of the solid to be dried, such as the drying tube and the collector, are at a temperature equal to that within the tube, the temperature of the tube wall at any one cross section is much higher than the temperature of the solid to be dried which is passing through that cross section. Accordingly, if the tube temperature is above the fusion adhesion temperature of the solid, the solid will tend to adhere readily to the inner wall, and even in instances when it does not assume a fusion adhesive state, the solid adhering to the inner wall in the state of particles are subjected to a high temperature for a long time and decompose or undergo such other detrimental change.

According to the present invention since the drying tube (and other essential parts) are cooled from the outside, the temperature of the inner surface of the tube wall becomes less than the temperature of the solid passing through the drying tube. Accordingly, there is no possibility of the solid being melted or being decomposed.

We have found that it is not always necessary to cool the entire drying tube and that it is highly advantageous even to cool only the vicinity of the high-temperature inlet. If necessary, the other parts of path of the material to be cooled such as the collector may be additionally cooled.

In reducing the present invention to practice, the cooling of the parts of the apparatus may be accomplished by any suitable method with a liquid or a gas. The temperature of the coolant need not always be below room temperature, the thermal efficiency in some cases even being made more advantageous by maintaining the coolant temperature at a slightly high value through utilization of waste heat such as that of the air heater of the drying apparatus.

The nature, utility, and details of the invention will be more clearly apparent from the following detailed description with respect to the following example of preferred embodiment of the invention, when read in conjunction with the accompanying drawing.

In the drawing, the single figure is a flow chart showing an example of a parallel-flow pneumatic conveying drying apparatus provided with the improved feature according to the invention.

Referring to the drawing, the parallel-flow dryer shown therein consists, essentially, of a pneumatic-conveying drying system in which hot air is used as a conveying and drying medium, a material preparing and feeding system, and a cooling system.

The pneumatic-conveying drying system comprises, along the path of air flow, an air intake pipe 1, an air heater 2, an air filter 3, a drying tube 6, a product collector 7 of the so-called cyclone type provided at its bottom with an outlet 8 for dried product, and an exhaust fan 9 for motivating the drying air through the drying system.

The material feeding system, at its outlet part, comprises a feeding device 5 for feeding the solid material to be dried and a mill or disintegrator 4 for receiving the solid material from the feeding device 5 and feeding the ground solid into the drying tube 6 at a point 12 near the upstream end of the drying tube 6.

The cooling system, at its part installed on the drying system, comprises a coolant jacket 10 disposed around the drying tube 6 and provided with a coolant inlet 13 and a collant outlet 14 and a coolant jacket 11 disposed around the body of the collector 7 and provided with a coolant inlet 15 and a coolant outlet 16.

In the operation of the above described drying apparatus, the solid material to be dried is fed through the feeding device 5 and disintegrator 4 and, in ground form, is fed into the drying tube 6 at the point 12. In the drying tube 6, the ground solid material is mixed with heated air flowing at high velocity from the air filter 3 and is thereby dried as it is conveyod to the collector 7, where the solid material is separated from the air and is taken out through the outlet 8.

In an actual instance, a drying apparatus of the above description was operated continuously for 120 hours under the following conditions to dry a vinylidene chloride resin in a damp state, which had beena separated out from a body of water after polymerisation.

Vinylidene chloride resin feed rate, dry weight
    kg./hour__ 800
Moisture content of vinylidene chloride resin to be
    dried _____percent__ 18 to 25
Temperature of hot air supplied _____° C__ 145
Moisture content of dried product ___percent__ 1.5 to 2.0
Temperature of jacket cooling water at inlet __° C__ 10
Temperature of jacket cooling water at outlet _° C__ 60

As a result, almost no adherence of the product to the inner walls of the drying tube and the collector was observable.

During this operation, the quantity of heat absorbed by the cooling water was merely 1.5 percent of the quantity of heat in the supplied hot air.

As another experiment, the cooling jackets of the apparatus were removed, and the apparatus was operated in a manner similar to that described above except that cool air at 10 degrees C. was blown around the outer surfaces of the drying tube and the collector during the operation. As a result, a small quantity of a substance was observed to have adhered to inner surface of the drying tube after 30 hours of operation. The adhering substance was removed and weighed, whereupon its weight was found to be approximately 20 kg.

For comparison, the apparatus was operated in a similar manner without the cooling jackets and without any cooling whatsoever from the outside. After approximately 30 hours of operation, the drying tube became clogged, whereby the operation could not be continued further, and it was necessary to disassemble and clean the drying tube and the collector.

It was found that the quantity of adhering product, which was lost as scrap, was approximately from 250 kg. to 400 kg. for each run between successive shutdowns for cleaning. Since each shutdown for this cleaning required approximately 10 hours, it is apparent that, in this particular case, the drying efficiency can be increased by 30 percent or more by eliminating the necessity for this shutdown.

While the invention has been described above with respect to a particular example thereof in which a vinylidene chloride resin was dried by the aforedescribed parallel-flow pneumatic conveying drying apparatus, the present invention is not limited in application to the drying of vinylidene chloride resins, it being similarly applicable to the drying of numerous other solid materials which tend to be decomposed or rendered into adhesive states by the high temperature of the hot drying air, examples of such solid materials being polyvinyl chloride resins, various food products, and various agricultural chemicals.

Thus, as described above, the present invention provides an improved technique for parallel-flow pneumatic-conveying drying of solid materials which not only prevents loss of material through its adherence to the apparatus walls and lowering of the product quality of the material, but also affords other advantages. For example, the invention affords a substantial increase in the performance of the drying apparatus by decreasing the frequency of shutdowns necessitated by clogging of the drying tube. Furthermore, in the case of solid materials which very readily adhere to the apparatus parts, the heat loss of the air heating device due to suspensions of the operation is eliminated or substantially reduced, whereby the thermal efficiency is improved.

A further advantageous feature of the invention is that, since there is no possibility of decomposition, adhesion, and other undesirable changes in the solid material, the drying temperature may be raised in some cases to increase further the drying efficiency.

While various particular details have been set forth in the foregoing disclosure for the purposes of illustration, it is obvious that many changes and modifications can be made in these details without departing from the nature and spirit of the invention, wherefore it is to be understood that the invention is not to be limited to the details described herein.

What we claim is:

1. In the parallel-flow pneumatic-conveying drying of solid materials which are readily decomposed or rendered adhesive by the drying temperature by means of a parallel-flow pneumatic-conveying dryer having a drying tube and a product collector, the process improvement for preventing the solid materials from being decomposed or adhering to interior parts of the dryer which comprises forced cooling of at least one part of the outer surfaces of the walls of the drying tube and the product collector during the operation of the dryer.

2. The process improvement as claimed in claim 1 in which the forced cooling is accomplished by passing cooling water over said at least one part of the outer surfaces of the walls of the drying tube and the product collector.

3. In a parallel-flow pneumatic-conveying drying apparatus of the type having a drying tube and a product collector, a cooling system for forced cooling of at least a part of the outer surfaces of the walls of the drying tube and the product collector during the operation of the drying apparatus.

4. The cooling system as claimed in claim 3 in which there is provided means for passing cooling water over said at least a part of the outer surfaces of the walls of the drying tube and the product collector.

5. The process improvement as claimed in claim 2 in which the cooling water is supplied at a temperature of approximately 10 degrees C.

References Cited

UNITED STATES PATENTS

| 3,370,358 | 2/1968 | Esser et al. | 34—10 |
| 3,280,472 | 10/1966 | Lorenian | 34—10 |
| 3,293,771 | 12/1966 | Lawrence et al. | |

JOHN J. CAMBY, Primary Examiner